(No Model.)

R. S. THOMPSON.
CASTER.

No. 340,170. Patented Apr. 20, 1886.

Witnesses:
M. Berrard
L. P. Clawson

Rachel S. Thompson
Inventor
by James H. See
Attorney

UNITED STATES PATENT OFFICE.

RACHEL S. THOMPSON, OF HAMILTON, OHIO.

CASTER.

SPECIFICATION forming part of Letters Patent No. 340,170, dated April 20, 1886.

Application filed January 25, 1886. Serial No. 189,593. (No model.)

*To all whom it may concern:*

Be it known that I, RACHEL S. THOMPSON, of Hamilton, Butler county, Ohio, have invented certain new and useful Improvements in Casters, of which the following is a specification.

This invention pertains to casters for use with furniture, and relates, particularly, to that class of two-wheeled casters often spoken of as "oscillating casters."

My improvement will be readily understood from the following description, taken in connection with the accompanying drawings, in which—

Figure 1:
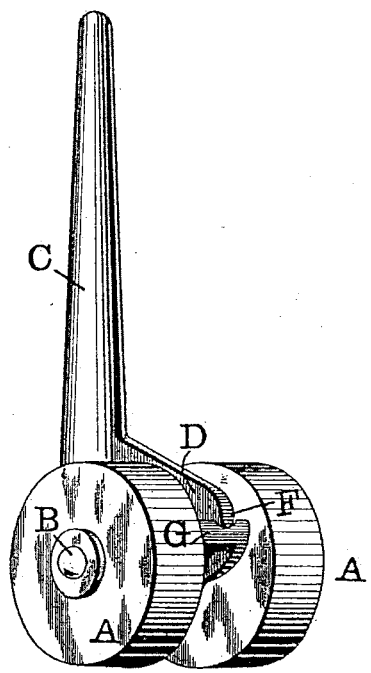
Figure 2:
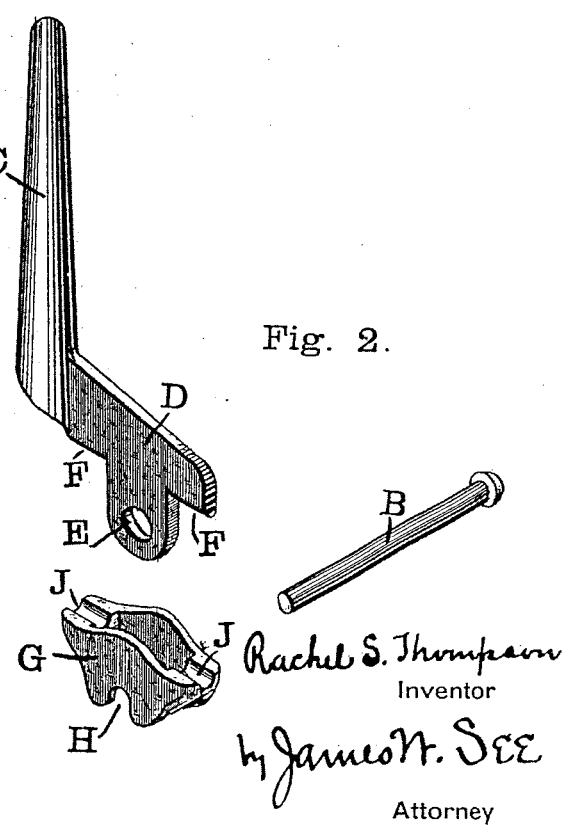

Figure 1 is a perspective view of a caster, illustrating my improvements, and Fig. 2 a perspective view of a number of the parts dissected.

In the drawings, A indicates the two floor-wheels of the caster; B, the axle of the floor-wheels; C, a stem adapted to fit up into and revolve within a socket in the piece of furniture or other article to which the caster may be attached; D, a wing formed upon the foot of the stem, and projecting to the rear thereof between the two floor-wheels; E, a hole through this wing loosely engaging the axle between the two wheels; F, pivot-bearings formed upon the wing and disposed horizontally at right angles to the axle; G, a block disposed between the two floor-wheels and serving to keep them apart; H, openings in the base of the block engaging the axle, and J bearings in the block engaging the pivot-bearings F of the wing.

The rotation of the stem C in the socket which it may engage permits the swiveling of the caster.

The wing serves to connect the axle and wheels with the stem, and the looseness of the fit of the hole E upon the axle permits the axle and floor-wheels to oscillate with reference to the stem, whereby inequalities of floor-surface are compensated for.

In putting the caster together the axle is passed through one of the wheels, then through the hole E, then through the other wheel, and then headed or otherwise provided to prevent displacement.

The block E is useful in connection with casters liable to be subjected to heavier strains than could be withstood by the axle in case the upper part of the hole E bears directly upon the center of the axle. When the block is employed, its openings H bear upon the top of the axle, and the pivot-bearings F of the wing rest in the bearings J, thus distributing the vertical strains over more of the length of the axle than would be the case with the block omitted. The block also serves in separating the wheels.

In putting the caster together, when the block is employed, the process is as before described, except that the block and wing are slipped upon the axle at the same time. The block has a central mortise which loosely receives the perforated part of the wing.

I claim as my invention—

1. In a caster, the combination of an axle, two floor-wheels upon the same, a stem adapted to engage and rotate within a socket in furniture or the like, and a wing integrally formed upon the base of the stem and provided with a hole engaging the axle between the two floor-wheels and adapted for oscillation upon the axle, substantially as and for the purpose set forth.

2. In a caster, the combination of an axle, two floor-wheels upon the same, a block disposed between the floor-wheels and engaging over the axle, a stem adapted for attachment to furniture or the like, and a wing integrally formed with a stem and projecting between the two floor-wheels and engaging the axle and the block, substantially as and for the purpose set forth.

3. In a caster, the combination of axle B, two floor-wheels, A, upon the same, a stem, C, fitted to engage and rotate in a socket in furniture or the like, a wing, D, integrally formed with the stem and projecting outward over the base thereof between the two floor-wheels, the hole E in the wing encircling the axle, the pivot-bearings F, formed upon the wing, and the block G, disposed upon the axle between the floor-wheels and engaged by the pivot-bearings of the wing, substantially as and for the purpose set forth.

RACHEL S. THOMPSON.

Witnesses:
FRANK E. THOMPSON,
W. A. SEWARD.